United States Patent [19]

Stibal et al.

[11] Patent Number: 5,376,702
[45] Date of Patent: Dec. 27, 1994

[54] PROCESS AND APPARATUS FOR THE DIRECT AND CONTINUOUS MODIFICATION OF POLYMER MELTS

[75] Inventors: Werner Stibal, Trimmis; Daniel Boni, Domat/Ems; Hans Luckert, Chur, all of Germany

[73] Assignee: EMS-Inventa AG, Switzerland

[21] Appl. No.: 780,144

[22] Filed: Oct. 21, 1991

[30] Foreign Application Priority Data

Oct. 19, 1990 [DE] Germany .............................. 4033319
Dec. 13, 1990 [DE] Germany .............................. 4039857

[51] Int. Cl.⁵ .......................... C08J 3/20; C08K 3/22; B29B 7/84; B29C 47/74
[52] U.S. Cl. ........................... 523/313; 264/211.18; 264/211.23; 264/349; 425/382.3; 523/348; 523/351; 524/413; 524/497
[58] Field of Search ............... 425/382.3; 264/349, 264/211.18, 211.23; 523/313, 351, 348; 524/413, 497

[56] References Cited

U.S. PATENT DOCUMENTS

| | | | |
|---|---|---|---|
| 4,182,601 | 1/1980 | Hill | 425/382.3 |
| 4,461,734 | 7/1984 | Jones et al. | 425/382.3 |
| 4,793,957 | 12/1988 | Lovegrove | 425/382.3 |
| 4,867,927 | 9/1989 | Funaki et al. | 425/382.3 |

OTHER PUBLICATIONS

Mack, Wolfgang A., "Continuous Compounding—Where Twin-Screws Fit," *Plastics Technology,* Feb., 1975, pp. 45–49.
Murray, Thomas A., "Here's Your Guide to Continuous Melt Compounding Machinery," *Plastics Technology,* Dec. 1978, pp. 65–72.

*Primary Examiner*—Paul R. Michl
*Assistant Examiner*—Andrew E. C. Merriam
*Attorney, Agent, or Firm*—Jordan B. Bierman

[57] ABSTRACT

A process and an apparatus for the direct, continuous and flexible modification of polymer melts by branching off a brand melt stream from the main melt stream to be modified, dispersing the initially introduced additive in the melt in a specially designed twin-screw extruder, and subsequent recycling of the additive melt concentrate to the melt stream to be modified.

15 Claims, 2 Drawing Sheets

PROCESS AND APPARATUS FOR THE DIRECT AND CONTINUOUS MODIFICATION OF POLYMER MELTS

The invention relates to a process for the direct, continuous incorporation of additives into polymer melts in a side stream and is distinguished by a very high degree of flexibility with respect to product change-over.

BACKGROUND OF THE INVENTION

For various reasons, polymer melts have to be modified with additives. For example, such melts are substantially transparent because the homogeneous structure of the synthetic polymers does not permit refraction or reflection of light. Therefore, for applications, pigments, such as $TiO_2$, ZnS, or carbon black, are added to polymer melts. It is desirable to rid the melt before spinning of the unattractive, greasy luster which has a disturbing esthetic effect, especially when the fibers are to be used for clothing. The elimination of the luster takes place by adding a relatively small amount of a whitening pigment, usually titanium dioxide. The modification of polymer melts by the use of additives for other purposes is also known; e.g. for producing antipilling fibers or for the optical brightening of polymers with e.g. a yellow tinge.

With the increasing output of continuous polycondensation plants, only production lines with a high degree of flexibility are economical. Often, the parallel production of different types of products, such as fiber and granules, must be possible at the same time on a single production line. In such cases, the change-over to different products, such as for example, delustered, lustered, or pigmented, should be effected within the shortest time and, as far as possible, with no loss. These requirements are met only inadequately by the methods available heretofore.

It is well known that melts can be modified with the help of masterbatch products. This principle is described in German Offenlegungsschrift 16 04 368. A melt from masterbatch granules and containing a high percentage of additive is introduced into the polymer melt in a defined ratio. Although this process offers high flexibility with respect to change-overs of finish, it has substantial disadvantages. First, the masterbatch granules must be dried before melting; second, during remelting they undergo additional thermal and mechanical loading; and third, there are additional handling costs. Another disadvantage is the risk of external soiling of the granules. In the case of in-house masterbatch production, there is the added drawback that polymer granules have to be taken from the production process. If the masterbatch granules are obtained elsewhere, there are likely to be differences between the polymers used which have an adverse effect on the properties of the final product.

A variant of the above process is described in Chemical Engineering Progress 78 (1982) 1, pages 62-64. Instead of introducing the additive into the polymer melt downstream, both the polymer granules and the preferably reactive additives are introduced into the first extruder zone. The disadvantages of this process are, on the one hand, the risk of compacting of the additive between the granules and, on the other hand, the high shearing stresses which are necessary for homogenization and dispersion. The latter result in a large, uncontrollable reduction in the viscosity of the polymer.

A further state of the art process is described in Chemiefasern und Textilindustrie 1 (1986), pages 24 to 29. A partial stream is branched off from the main stream emerging from the polycondensation finisher and the additive is incorporated into the melt downstream. This additive-charged melt is recycled into the main melt stream. This process also has a high degree of flexibility in additive change-overs, but also several major disadvantages. One is that, in spite of evacuation, the volatile constituents contained in the polymer melt, such as glycol, water, or oligomers, due to vaporization thereof, escape through the filling funnel during the feeding-in of the additives. This results in reduced free-flowability of the additive and increases lump formation. Additive agglomerates can no longer be incorporated homogeneously into the melt and, during the spinning process, they cause clogging of the filters as well as weak points in the filaments. In addition, continuous, uniform metering of the additive is impaired by the thermal convection resulting from the hot melt and barrel, which keeps the additive particles, usually fed in free falls, in suspension at the feeding point. A further disadvantage is that the extruder opening for the feeding of the additive must be kept small in order to reduce the risk of melt escaping at this point. Consequently, the amount of additive is also limited.

SUMMARY OF THE INVENTION

The object of the present invention is to provide a process and an apparatus for the direct, continuous modification of polymer melts without the above disadvantages.

In the process according to the invention, polymer melts, preferably polyester, polyamide, or polyolefin, most preferably polyester, are modified with additives. Such additives may be soluble or insoluble, mineral or organic pigments, such as ZnS, $SiO_2$, and $TiO_2$, preferably $TiO_2$, or other melt-modifying additives improving the properties of the product, such as optical brighteners and light and heat stabilizers, preferably optical brightening agents.

In the process according to the invention, the additive, which may also be mixture, is initially introduced alone into the first extruder zone and the melt stream is fed in in the second zone. Subsequently, the additive is wetted with the polymer melt, the mixture is passed through a degassing zone and, furthermore, is, homogeneously dispersed in known manner and conveyed to the extruder outlet. The wetting of the additive, initially introduced by itself, with the polymer melt in the closed extruder filled to as great an extent as possible has the advantage that no volatile melt constituents can leave rearwards and adversely affect the feeding in of the additive. This is assisted by the evacuation, which is arranged downstream and carries away even volatile constituents, such as moisture, from the additive. In order to avoid a compacting or briquetting of the unwetted additive until melt entry, the height of the flight land of the screws in this zone must be reduced, as compared to those of the screws in the other zones. According to experience, reduction of the screw diameters of 0.2 to 4 mm, preferably of 0.5 to 2 mm, is adequate for this. 0.5 to 1 mm is particularly preferred for delustering agents such as titanium dioxide and polyester or polyamide as the polymer. The dispersing and conveying of the additive-polymer mixture takes place in the conventional way by means of suitable screw elements in the remaining extruder zones.

In the process according to the invention, the wetting by the polymer melt is possible with additives which satisfy a special test method-the so called pressure test-in which the mass throughput per minute of a melt simulating substance through a filter of defined mesh width is determined at the beginning of the test and after 30 minutes. For polyterephthalate melts and polyamide 6 melts, use on an industrial scale is ensured for (1) extrusion and injection-molding with a residual quantity of 90%, (2) fiber and Filament spinning with a residual quantity of 60%, and (3) for POY and FOY yarns with a residual quantity of 40%.

Pressure Test:

In a model substance (e.g. polyethylene glycol) having the same viscosity as the polymer melt to be modified at the corresponding temperature, the additive is dispersed, heated to the measuring temperature and passed through a filter of 11 to 13 μm nominal width. The amounts of materials flowing through the filter are then determined, $m_1$ in the time interval $t_1$ which is the sixth minute of flow, and $m_2$ in the time interval $t_2$ which is the 36th minute of flow; the drop (D) in material throughput (in percent) is $$D = \frac{m_1 - m_2}{m_1} \times 100$$

BRIEF DESCRIPTION OF THE DRAWINGS

In the accompanying drawings, constituting a part hereof and in which like reference characters indicate like parts.

DETAILED DESCRIPTION OF THE INVENTION

Figure 1:
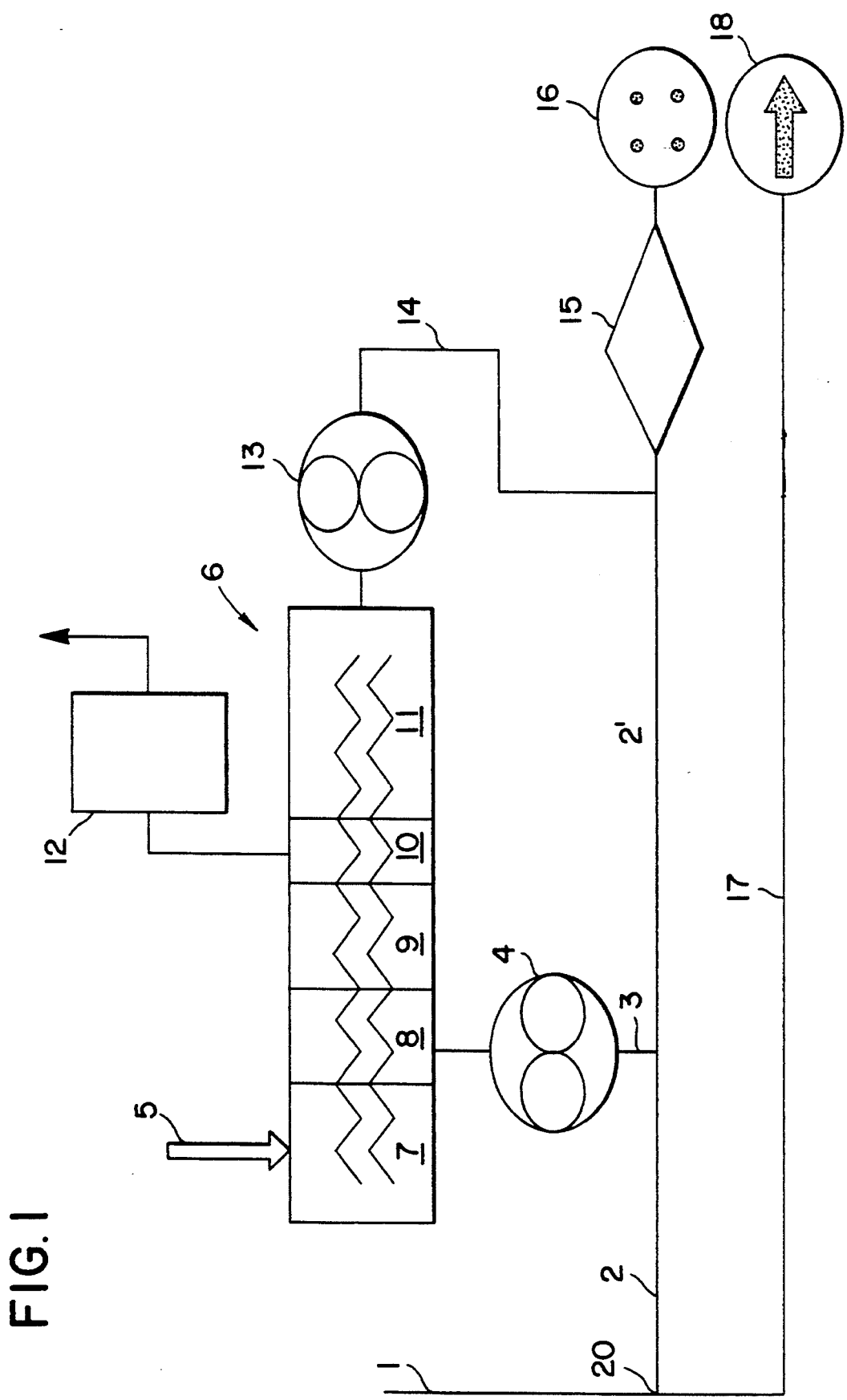
FIG. 1 is a schematic flow diagram of the inventive process.

Referring specifically to FIG. 1, main melt stream 1 carries all of the polymer to be processed. At point 20, it divides into unmodified stream 17 and branch stream 2 which is to receive the additives. Side stream 3 takes a portion of the flow in branch stream 2, and feed pump 4 delivers it to melt entry zone 8 of extruder 6. The additive is introduced by additive feed 5 into metering zone 7. The additive is carried by extruder 6 from zone 7 to melt entry zone 8 and thence, along with the polymer melt, to wetting zone 9. As the mixture continues its flow, it passes through degassing zone 10 into dispersing zone 11. Degassing device 12 removes volatiles from zone 10.

Thereafter, the stream, containing the desired additives, is returned to branch stream 2 by return pump 13 via modified side stream 14. The mixture enters static mixer 15 where blending with branch stream 2 is completed and, thereafter, flows through spinning point 16 to be made into fiber.

Simultaneously, unmodified stream 17 is directed to granulator 18 for formation into raw granules. In this manner, a single production line is capable of producing two types of polymers simultaneously or alternatively. There is no "down time" of the line if it is desired to switch from one to the other.

With the process and apparatus of the invention, polymer melts can be modified by the introduction of 0.01 to 16% by weight, preferably 0.04 to 0.6% by weight, particularly preferably 0.4% by weight, of additive based on the melt polymer.

Figure 2:
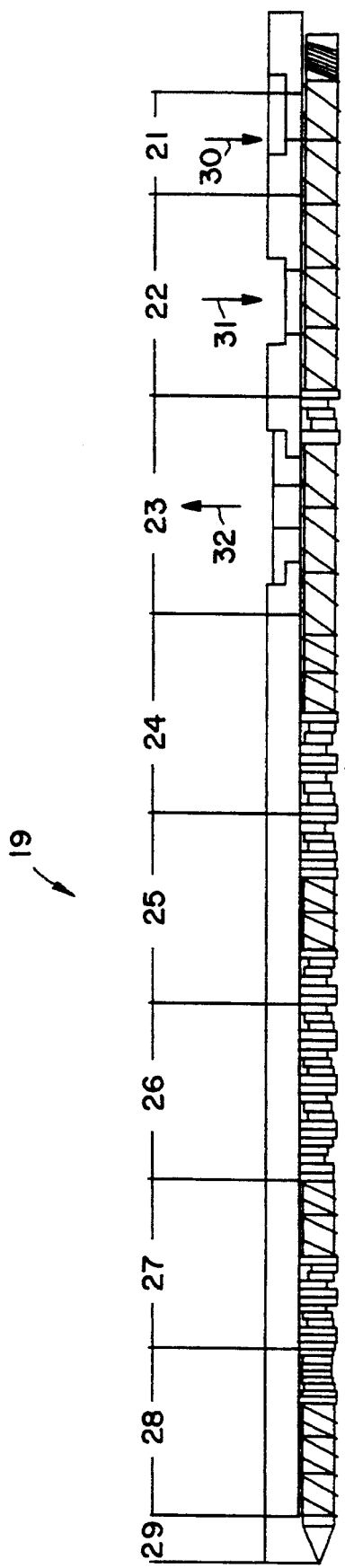
FIG. 2 is a schematic view of an extruder in accordance with the present invention.

Referring more particularly to FIG. 2, apparatus in accordance with the present invention is schematically shown. The additive is metered into metering zone 21 at 30 and the polymer melt enters melt entry zone 22 at 31. The additive is transferred by the screw of extruder 19 from metering zone 21 to melt entry zone 22. The mixture of polymer melt and additive then moves into degassing zone 23 where the volatiles are removed as indicated by arrow 32. Once this is accomplished, the mixture then flows through dispersing zones 24 through 28 and exists at screw nose 29.

A suitable extruder is type ZE 40 A (produced by Messrs. Berstoff) having heatable and coolable zones. This device comprises a co-rotating twin screw and is specially designed as described herein. It has been found particularly suitable if the diameters of the screw elements are reduced by 0.2 to 4.0 mm, preferably by 0.5 to 2 mm, and most preferably by 0.5 to 1 mm. Melt entry zone 8 has known conveying elements and wetting zone 9 is provided with kneading and retarding elements. Degassing zone 10 also has known conveying elements and dispersing zone 11 is equipped with both conveying and kneading elements. Metering zone 7 can be cooled if temperature-sensitive additives are used.

Additive feeding device 5 is preferably a dropping pipe. Of course, other additive feed means can be substituted if desired or convenient.

The process and apparatus according to the invention provide a high degree of flexibility. Additive changeovers can be performed immediately and with virtually no loss of time, without expensive cleaning operations and without the formation of inferior product finishes. Additive carrier polymers are not necessary and, therefore, there are no disadvantageous effects on the properties of the final product. There is no need for complex interventions in the production process, such as the production of in-house masterbatches, no escape of polymer melt and/or volatile fractions during introduction of the additives; agglomerate-free modifying of the melt and consequently prolonged filter service lives. Moreover, the invention achieves considerably lower screw speeds than are necessary in the prior art, no predrying of the additive is required, and only minimal, constant viscosity reduction of the polymer melt occurs. Due to the present invention, it is possible to dimension the extruder additive feed opening as large as the entire screw cross-section. There is no limitation of the quantity of additive fed in or of the melt throughput depending on the extruder size; continuous, uniform metering-in of the additive into the first extruder zone without thermal conduction problems is obtained; the possibility that the first extruder zone can be cooled if temperature-sensitive additives are used; and the use of processing aids as in the prior art is not necessary.

The following examples illustrate preferred embodiments of the invention without restricting it.

EXAMPLE 1

0.72 kg/h of titanium dioxide (Messrs. Sachtleben, type LOCR-S-U) is metered into the first zone of a twin-screw extruder equipped with the screw configuration according to FIG. 2 and cooled to 50° C. It is conveyed by the screws having diameters reduced by 0.5 mm into the second extruder zone. In parallel, a partial stream to be modified, of 120 kg/h, is divided from the polyethylene terephthalate melt main stream and the side stream of 9 kg/h is in turn branched off the partial stream and directed onto the titanium dioxide which has been conveyed into the second extruder zone.

The further incorporation of the titanium dioxide into the polymer melt takes place with the following machine setting data, the quoted barrel temperatures being achieved by cooling or heating. The resulting titanium dioxide-delustered side melt concentrate contains 8% by weight of $TiO_2$, which corresponds to a final pigment content of 0.6% by weight of $TiO_2$ in the modified melt stream.

| | |
|---|---|
| Temperature of the polyethylene terephthalate melt side stream on entry into the second extruder zone: | 290° C. |
| Speed of extruder: | 250 rpm |
| Power consumption of extruder: | 8.8 A |
| Applied voltage: | 385 V |
| Extruder counterpressure: | 40 Bar |
| Temperature of the modified polyethylene terephthalate side melt stream after leaving the extruder: | 270° C. |
| Barrel temperatures: | |
| zone 1 | 50° C. |
| zone 2 | 225° C. |
| zone 3 | 265° C. |
| zone 4 | 265° C. |
| zone 5 | 270° C. |
| zone 6 | 270° C. |
| zone 7 | 270° C. |
| zone 8 | 270° C. |
| nose | 265° C. |

EXAMPLE 2

0.32 kg/h of titanium dioxide (Messrs. Kronos, type AVF 9009) is metered into the first zone of the twin-screw extruder of FIG. 2 and cooled to 50° C. It is then conveyed by the screws in the first extruder zone, having diameters reduced by 1 mm, into the second extruder zone. In parallel, a partial stream to be modified of 53 kg/h, is divided from a polyamide 6 melt main stream and a side stream of 8 kg/h is in turn branched off the partial stream and directed onto the titanium dioxide which has been conveyed into the second extruder zone.

Further incorporation of the titanium dioxide into the polyamide melt takes place with the following machine settings, the quoted barrel temperature being achieved by cooling or heating. The resulting titanium dioxide-modified polyamide side melt concentrate contains 4% by weight of $TiO_2$, which corresponds to a final pigment content of 0.6% by weight of $TiO_2$ in the modified part melt stream.

| | |
|---|---|
| Temperatures of the polyamide 6 melt side stream on entry into the second extruder zone: | 280° C. |
| Speed of extruder: | 150 rpm |
| Power of consumption of extruder: | 9 A |
| Applied voltage: | 230 V |
| Extruder counterpressure: | 40 bar |
| Temperature of the modified polyamide 6 side melt stream after leaving the extruder: | 277° C. |
| Barrel temperatures: | |
| zone 1 | 50° C. |
| zone 2 | 225° C. |
| zone 3 | 263° C. |
| zone 4 | 265° C. |
| zone 5 | 270° C. |
| zone 6 | 270° C. |
| zone 7 | 270° C. |
| zone 8 | 265° C. |
| nose | 265° C. |

EXAMPLE 3

The process according to Example 1 was carried out except that the extruder settings were as follows:

| | |
|---|---|
| Screw diameter reductions in the first extruder zone: | 1 mm |
| Polyethylene terephthalate melt main stream: | 3000 kg/h |
| Polyethylene terephthalate melt side stream: | 75 kg/h |
| Titanium dioxide (Messrs. Sachtleben, type LOCR-S-U): | 12 kg/h |
| $TiO_2$ content of the modified side stream: | 16% by weight |
| Final $TiO_2$ content of the modified part melt stream: | 0.4% by weight |
| Temperature of the polyethylene terephthalate melt side stream on entry into the second extruder zone: | 292° C. |
| Speed of extruder: | 250 rpm |
| Power consumption of extruder: | 21 A |
| Applied voltage: | 240 V |
| Extruder counterpressure: | 20 bar |
| Temperature of the modified polyethylene terephthalate side melt stream after leaving the extruder: | 281° C. |
| Barrel Temperatures: | |
| zone 1 | 30° C. |
| zone 2 | 240° C. |
| zone 3 | 260° C. |
| zone 4 | 260° C. |
| zone 5 | 260° C. |
| zone 6 | 260° C. |
| zone 7 | 260° C. |
| zone 8 | 260° C. |
| nose | 260° C. |

EXAMPLE 4

The process of Example 1 was followed except that the polyethylene terephthalate side stream was modified with an optical brightener (Messrs. Eastman Kodak, type Optical brightener OPT-1) with the following settings in the extruder.

| | |
|---|---|
| screw diameter reductions in the first extruder zone: | 0.5 mm |
| Polyethylene terephthalate melt main stream: | 120 kg/h |
| Polyethylene terephthalate melt side stream: | 9 kg/h |
| Optical brightener: | 36 g/h |
| Content of optical brightener in the modified side melt stream: | 0.4% by weight |
| Final content of optical brightener in the modified part melt stream: | 0.3% by weight |
| Temperature of the polyethylene terephthalate melt side stream on entry into the second extruder zone: | 290° C. |
| Speed of extruder: | 250 rpm |
| Power consumption of extruder: | 8.8 A |
| Applied voltage | 385 V |
| Extruder counterpressure: | 40 bar |
| Temperature of the polyethylene terephthalate side melt stream, modified with the optical brightener after leaving the extruder: | 270° C. |
| Barrel temperatures: | |

| zone 1 | 50° C. |
| zone 2 | 225° C. |
| zone 3 | 265° C. |
| zone 4 | 265° C. |
| zone 5 | 270° C. |
| zone 6 | 270° C. |
| zone 7 | 270° C. |
| zone 8 | 270° C. |
| nose | 265° C. |

While only a limited number of specific embodiments have been expressly disclosed, it is, nonetheless, to be broadly construed and not to be limited except by the character of the claims appended hereto.

What we claim is:

1. A process for direct, continuous, introduction of at least one solid, difficultly soluble additive into a polymer melt, said process comprising dividing an initial main stream of said melt into a branch stream and an unmodified stream, dividing said branch stream into a reduced stream and a side stream, providing an extruder having a plurality of sequential zones which plurality comprises a metering zone, a melt entry zone, a wetting zone, a degassing zone, and a dispersing zone, metering said additive into said metering zone having a screw of reduced diameter compared to a larger diameter in said entry zone, said wetting zone, said degassing zone, and said dispersing zone, conveying said additive into said melt entry zone, feeding said reduced stream into said melt entry zone to form an initial mixture, conveying said initial mixture into said wetting zone to form a wetted mixture, conveying said wetted mixture into said degassing zone to remove volatiles from said wetted mixture to form a degassed mixture, conveying said degassed mixture into said dispersing zone to form a dispersed mixture, and discharging said dispersed mixture into a modified stream, introducing said dispersed mixture in said modified stream into said side stream and blending it therewith to form a final mixture.

2. A process for direct, continuous, introduction of at least one additive into a polymer melt, said process comprising dividing a branch stream (2) into a reduced stream (3) and a side stream (2'), providing an extruder (6) having a plurality of sequential zones which plurality comprises a metering zone (7) which is upstream of a melt entry zone (8), a wetting zone (9), a degassing zone (10), and a dispersing zone (11), metering said additive into said metering zone (7) having a screw of reduced diameter compared to a larger diameter in said entry zone (8), said wetting zone (9), said degassing zone (10), and said dispersing zone (11), conveying said additive into said entry zone (8), feeding said reduced stream (3) into said melt entry zone (8) to form an initial mixture, conveying said initial mixture into said wetting zone (9) to form a wetted mixture, conveying said wetted mixture into said degassing zone (10) to remove volatiles from said wetted mixture to form a degassed mixture, conveying said degassed mixture into said dispersing zone (11) to form a dispersed mixture, and discharging said dispersed mixture into a modified stream (14), introducing said dispersed mixture in said modified stream (14) into said side stream (2') and blending it therewith to form a final mixture.

3. The process of claim 2 wherein an initial main stream (1) of said melt is divided into said branch stream (2) and an unmodified stream (17).

4. The process of claim 3 wherein said extruder has at least two screws to convey said mixtures.

5. The process of claim 4 wherein said extruder has twin screws.

6. The process of claim 2 wherein said polymer is a polyamide or a polyester.

7. The process of claim 6 wherein said polymer is said polyester.

8. The process of claim 2 wherein said additive is selected from the group consisting of soluble colorants, insoluble colorants, mineral colorants, organic colorants, and optical brightening agents.

9. The process of claim 8 wherein said additive is titanium dioxide.

10. The process of claim 2 wherein said additive is in an amount of 0.02% to 16% by weight based on said polymer melt.

11. The process of claim 10 wherein said amount is 0.04% to 0.6%.

12. The process of claim 11 wherein said amount is about 0.4%.

13. The process of claim 2 wherein reduction of material throughput per minute of said additive dispersed in a model substance of the same viscosity as said polymer melt, after 30 minutes filtration through a filter of 11 to 13 μm normal width at constant pressure, does not exceed 60% by weight.

14. The process of claim 13 wherein said reduction does not exceed 40% by weight.

15. The process of claim 10 wherein said extruder has twin screws having diameters in said metering zone which are 0.5 to 1 mm less than in any other of said zones and said polymer is a polyamide or a polyester.

* * * * *